US012585570B2

(12) United States Patent
Gai et al.

(10) Patent No.: US 12,585,570 B2
(45) Date of Patent: Mar. 24, 2026

(54) MICROCHIP WITH ON-CHIP DEBUG AND TRACE ENGINE

(71) Applicant: HUAWEI TECHNOLOGIES CO., LTD., Shenzhen (CN)

(72) Inventors: Paolo Gai, Pisa (IT); Francisco Fons Lluis, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 18/181,364

(22) Filed: Mar. 9, 2023

(65) Prior Publication Data

US 2023/0229583 A1 Jul. 20, 2023

Related U.S. Application Data

(63) Continuation of application No. PCT/EP2020/075291, filed on Sep. 10, 2020.

(51) Int. Cl.
*G06F 11/362* (2025.01)
(52) U.S. Cl.
CPC .................................. *G06F 11/364* (2013.01)
(58) Field of Classification Search
CPC .................................................... G06F 11/364
See application file for complete search history.

(56) References Cited

U.S. PATENT DOCUMENTS

| | | | |
|---|---|---|---|
| 6,615,371 B2 | 9/2003 | Mccullough et al. | |
| 6,983,441 B2 | 1/2006 | Wescott | |

| | | | |
|---|---|---|---|
| 7,080,283 B1 * | 7/2006 | Songer ................ | G06F 11/3636 |
| | | | 714/30 |
| 8,019,832 B2 * | 9/2011 | De Sousa ...... | G01R 31/318516 |
| | | | 709/217 |
| 8,661,303 B2 | 2/2014 | Lau et al. | |
| 8,689,063 B2 | 4/2014 | Xu | |
| 9,015,542 B2 | 4/2015 | Jones et al. | |

(Continued)

FOREIGN PATENT DOCUMENTS

| | | |
|---|---|---|
| CN | 103116349 A | 5/2013 |
| CN | 107122304 A | 9/2017 |

(Continued)

OTHER PUBLICATIONS

"IEEE Standard Test Access Port and Boundary-Scan Architecture," IEEE-SA Standards Board, IEEE Std 1149.1-2001 (Revision of IEEE Std 1149.1-1990), Total 208 pages (Jun. 2001).

(Continued)

*Primary Examiner* — Jigar P Patel
(74) *Attorney, Agent, or Firm* — Leydig, Voit & Mayer, Ltd.

(57) ABSTRACT

A microchip includes a central processing unit (CPU) configured to execute a software application. The microchip further includes an Ethernet interface configured to transmit Ethernet packets to and receive Ethernet packets from an external debugging entity. The microchip further includes an on-chip debug and trace module configured to transform debugging data and trace data from the CPU into a stream of Ethernet packets, and to provide the stream of Ethernet packets to the Ethernet interface for transmitting the stream of Ethernet packets to the external debugging entity.

15 Claims, 3 Drawing Sheets

(56)                    References Cited

U.S. PATENT DOCUMENTS

| | | |
|---|---|---|
| 2004/0019827 A1* | 1/2004 | Rohfleisch ....... G01R 31/31705 |
| | | 714/29 |
| 2008/0229152 A1 | 9/2008 | Moroda |
| 2010/0095154 A1 | 4/2010 | Shih et al. |
| 2011/0161760 A1 | 6/2011 | Bansal |
| 2014/0013145 A1* | 1/2014 | Hopkins ............. G06F 11/3636 |
| | | 713/330 |
| 2016/0349326 A1* | 12/2016 | Grafton ............ G01R 31/31705 |
| 2019/0220386 A1 | 7/2019 | Schneider et al. |
| 2019/0271740 A1* | 9/2019 | Gu ................... G01R 31/31705 |
| 2020/0285559 A1* | 9/2020 | Kuehnis ............. G06F 11/3698 |

FOREIGN PATENT DOCUMENTS

| | | |
|---|---|---|
| EP | 2448121 A1 | 5/2012 |
| GB | 2548398 A | 9/2017 |
| JP | 2006120014 A | 5/2006 |

OTHER PUBLICATIONS

Rossler et al., "A Novel Debug Solution for Distributed Embedded Applications and Implementation Options," 978-1-61284-972-0/, ECON 2011, 37th Annual Conference of the IEEE Industrial Electronics Society, IEEE, total 6 pages (Nov. 2011).
Hammerschmidt, "Autonomous driving, electrification boosts market for test and measurement," eeNews Automotive, Market News, [online] https://www.eenewseurope.com/en/autonomous-driving-electrification-boosts-market-for-test-measurement/, Total 2 pages (May 2020).

\* cited by examiner

MICROCHIP WITH ON-CHIP DEBUG AND TRACE ENGINE

CROSS-REFERENCE TO RELATED APPLICATIONS

This application is a continuation of International Application No. PCT/EP2020/075291, filed on Sep. 10, 2020, the disclosure of which is hereby incorporated by reference in its entirety.

TECHNICAL FIELD

Embodiments of the present disclosure relate to on-chip debug and trace functionality in microchips or system-on-chip devices composed of single or multicore CPUs.

BACKGROUND

Developing software, for instance, for automotive applications embedded in microchips (e.g. microprocessors, microcontrollers or system-on-chip devices) targeting electronic control units (ECUs), is often challenging, because the applications are intrinsically real-time, requiring a continuous interaction with the environment (e.g. sensors and actuators). Testing is often done initially on simulated environments and hardware test benches, before a thoroughly testing in the field, which often involves driving very large distances with a vehicle in order to ensure the correct functioning of the device. Furthermore, the embedded applications running in automotive ECUs are often real-time applications running at high frequencies and with direct interaction with the environment. Usually, these types of applications cannot be stopped or slowed down for enabling an easier debugging of the software since this fact would interfere with system's timing and would perturb its behavior.

For debugging software applications, Joint Test Action Group (JTAG) and/or Embedded Trace Macrocell (ETM) trace ports integrated in the microchip allow providing good observability, traceability and controllability of the software applications. While ETM is sometimes missing in low-cost microchips in the automotive field, ETM is usually available in mid and high-end chips for automotive applications. JTAG and/or ETM are based on hardware mechanisms implemented inside the chip, which enables the possibility to debug and trace the software slightly modifying it.

The functionality usually offered by JTAG is debug access and boundary scan: (i) debug access is used by debugger tools to access the internals of a microchip making its resources and functionality available and modifiable, e.g. registers, memories and the system state; (ii) boundary scan is used by hardware test tools to test the physical connection of a device, for instance on a printed circuit board (PCB).

The functionality usually offered by ETM is code traceability, this means that it is possible to trace all instructions executed by a CPU without affecting the execution of the system.

However, due to technical (e.g. mechanical and physical) constraints, JTAG/ETM are usable only in a lab context, but not in the field (i.e. in real vehicles). One of the reasons is that JTAG/ETM signals are high-frequency signals and the cables involved in the debugging equipment for connecting to the JTAG/ETM pins have to be rather short. This becomes a very challenging issue in case the microchip is arranged in unreachable places (this often happens for automotive ECUs that are mounted near the engine of the vehicle).

Another possibility for software debugging is to use software monitoring and instrumentalization, for instance via AUTOSAR-compliant Diagnostic Communication Manager (DCM) and Diagnostic Event Manager (DEM) modules through low-frequency COM busses (e.g. UART, CAN). This approach usually involves (invasive) software modifications that may cause overheads or slightly different behavior with regard to the final production software version (debug mode versus target mode).

SUMMARY

Embodiments of the present disclosure provide a microchip with an improved on-chip debug and trace functionality, for instance, for debugging microchips in the field, by taking advantage of a fast communication based on Ethernet, which could route the low-level debugging data produced by per-core JTAG/ETM wires.

According to a first aspect, a microchip includes a central processing unit (CPU) configured to execute a software application that can be debugged. The microchip may be a system-on-a-chip or a component thereof. Moreover, the microchip includes a physical layer Ethernet interface, which may include an Ethernet controller, configured to transmit Ethernet packets to and receive Ethernet packets from an external debugging entity, such as a personal computer (PC) running a debugging software framework. Moreover, the microchip includes an on-chip debug and trace module, in particular a JTAG/ETM-over-Ethernet engine configured to transform debugging data, in particular JTAG debugging data from the CPU executing the software application, and trace data, in particular ETM trace data from the CPU, into a stream of Ethernet packets and to provide the stream of Ethernet packets to the Ethernet interface for transmitting the stream of Ethernet packets to the external debugging entity or software framework. In an implementation form, the on-chip debugging and trace module is further configured to receive debugging commands from the external debugging entity/framework in the form of one or more Ethernet packets for debugging the software application running on the CPU.

While in typical microchips the JTAG port is used by the external debugger tool or debugging software framework to interface the chip for debugging one or more cores, in embodiments of the microchip disclosed herein the external interface used by the microchip is not a JTAG port but an Ethernet port.

In a further possible implementation form of the first aspect, the debug and trace module comprises a JTAG decoder configured to decode the debugging data from the CPU.

In a further possible implementation form of the first aspect, the JTAG decoder is further configured to control JTAG clock signals and JTAG data signals for executing debugging commands addressed to the CPU.

In a further possible implementation form of the first aspect, the debugging and trace module comprises a JTAG protocol engine configured to translate debugging commands from the external debugging entity into a sequence of JTAG commands and to provide the sequence of JTAG commands to the JTAG decoder.

In a further possible implementation form of the first aspect, the debug and trace module comprises a JTAG packet forwarder configured to receive Ethernet packets including debugging commands from the external debugging entity via the Ethernet interface and forward the debugging commands to the JTAG protocol engine.

In a further possible implementation form of the first aspect, the debugging and trace module comprises an ETM decoder configured to decode the trace data from the CPU.

In a further possible implementation form of the first aspect, the ETM decoder is further configured to control one or more ETM clock signals and extract the trace data from one or more ETM data signals received from the CPU.

In a further possible implementation form of the first aspect, the debugging and trace module further comprises a RAM buffer, wherein the RAM buffer is configured to store the trace data.

In a further possible implementation form of the first aspect, the debugging and trace module further comprises an ETM protocol engine configured to distribute the trace data stored in the RAM buffer to a plurality of Ethernet packets.

In a further possible implementation form of the first aspect, the ETM protocol engine is further configured to determine a sequence of the plurality of Ethernet packets.

In a further possible implementation form of the first aspect, the debug and trace module further comprises an ETM packet forwarder configured to send the plurality of Ethernet packets from the RAM buffer via the Ethernet interface to the external debugging entity or debugging software framework in accordance with the sequence of the plurality of Ethernet packets determined by the ETM protocol engine.

In a further possible implementation form of the first aspect, the microchip may comprise a plurality of CPUs connected to the on-chip debug and trace module. In a further possible implementation form of the first aspect, the microchip comprises at least one further CPU configured to execute a further debuggable software application and a communication bus configured to communicatively connect the CPU and the further CPU with the debugging and trace module, wherein the debugging and trace module is configured to transform further debugging data from the further CPU executing the further software application and further trace data from the further CPU into a further stream of Ethernet packets and to provide the further stream of Ethernet packets to the Ethernet interface for transmitting the further stream of Ethernet packets to the external debugging entity or debugging software framework. In an implementation form, the on-chip debug and trace module is further configured to receive debugging commands from the external debugging entity in the form of one or more Ethernet packets for debugging the further software application running on the further CPU.

In a further possible implementation form of the first aspect, the microchip may comprise more than one CPUs as well as more than one on-chip debug and trace modules, wherein at least two CPUs are connected to a respective dedicated on-chip debugging and trace module. In a further possible implementation form of the first aspect, the microchip comprises at least one further CPU configured to execute a further debuggable software application and at least one further on-chip debugging and trace module, wherein the further debugging and trace module is configured to transform further debugging data from the further CPU executing the further software application and further trace data from the further CPU into a further stream of Ethernet packets and to provide the further stream of Ethernet packets to the Ethernet interface for transmitting the further stream of Ethernet packets to the external debugging entity, wherein the Ethernet interface is configured to transmit the stream of Ethernet packets provided by the debugging and trace module and/or the further stream of Ethernet packets provided by the further debugging and trace module to the external debugging entity. In an implementation form, the further on-chip debugging and trace module is further configured to receive debugging commands from the external debugging entity in the form of one or more Ethernet packets for debugging the further software application running on the further CPU.

In a further possible implementation form of the first aspect, the microchip further comprises a JTAG interface, in particular a plurality of JTAG pins.

According to a second aspect, a debugging system includes a microchip according to the first aspect and a debugging entity, wherein the debugging entity is configured to send and receive Ethernet packets via an Ethernet connection from the Ethernet interface of the microchip.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the present disclosure are described in more detail with reference to the attached figures and drawings, in which.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, aspects of embodiments of the present disclosure or aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
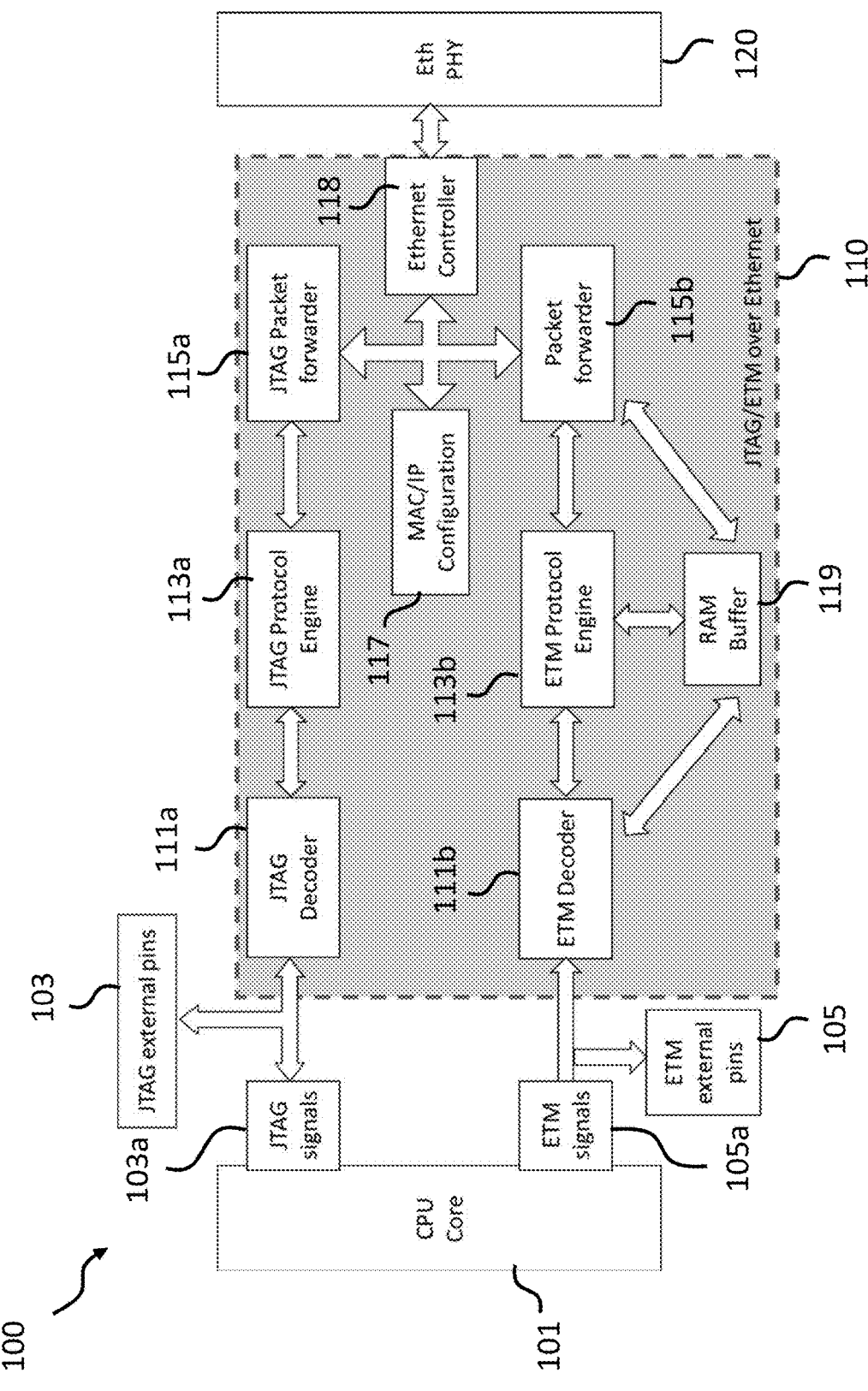
FIG. 1 shows a schematic diagram of a microchip with an on-chip debug and trace over Ethernet engine according to an embodiment.

FIG. 1 shows a schematic diagram of a microchip 100 according to an embodiment. The microchip 100 may be a system-on-a-chip 100 or a component 100 thereof. The microchip 100 comprises a central processing unit (CPU) 101 (referred to as "CPU core" in FIG. 1) configured to execute a software application that can be debugged and traced. Moreover, the microchip 100 comprises a physical layer Ethernet interface 120 (referred to as "Eth PHY" in FIG. 1), which is addressed by an Ethernet controller 118, configured to transmit Ethernet packets to and receive Ethernet packets from an external debugging entity, such as a debugging PC (not shown in FIG. 1). Moreover, the microchip 100 comprises an on-chip debug and trace module 110. As will be described in more detail below, the on-chip debug and trace module 110 may be implemented using an embedded core with related firmware, or directly in hardware creating state machines that interact with external pins for debugging.

In the following embodiments of the microchip 100 will be described, where the on-chip debug and trace module 110 is implemented as an on-chip JTAG/ETM-over-Ethernet debug and trace module 110 or on-chip JTAG/ETM-over-Ethernet engine 110 (referred to as "JTAG/ETM over Ethernet" in FIG. 1) making use of Joint Test Action Group (JTAG) and Embedded Trace Macrocell (ETM)) technologies. It will be appreciated, however, that the on-chip debug and trace module 110 may be implemented with debugging technology other than JTAG and/or ETM.

JTAG is a widely used technology in two main fields, namely (i) for boundary scan and chip debugging (used to debug an internal chip implementation) and (ii) for debugging of software applications running on the chip (for instance, for starting/stopping/programming a CPU; reading internal registers/memory; and/or configuring breakpoints, step-by-step execution, and the like). Moreover, JTAG and ETM trace ports allow good observability, traceability and controllability of a software application running on the CPU 101. Some features of JTAG and ETM technology, which may be implemented in an embodiment of the microchip 100 shown in FIG. 1, are summarized in the following. JTAG (as standardized by IEEE 1149.1) technology allows to stop, start and, in general, control a CPU, such as the CPU 101 shown in FIG. 1, to read the memory of a device, and to communicate using a serial device (typically referred to as JTAG UART). ETM technology allows fast streaming of data, i.e. a trace from a CPU, such as the CPU 101 shown in FIG. 1, to an external debugging entity. The trace may include one or more of the following data: a program trace (tracing all conditional jumps executed by a processor); a data trace (tracing addresses and values of data read/written); additional "tokens" (typically used to reconstruct an operating system context change in resource limited systems); and/or the time at which a given information is produced, i.e. a timestamp.

The on-chip JTAG/ETM-over-Ethernet debug and trace module 110 is configured to transform debugging data, in particular JTAG debugging data from the CPU 101 executing the software application and trace data, in particular ETM trace data from the CPU 101 into a stream of Ethernet packets and to provide the stream of Ethernet packets to the Ethernet interface 120 for transmitting the stream of Ethernet packets to the external debugging entity. In an embodiment, the on-chip JTAG/ETM-over-Ethernet debugging and trace module 110 may be further configured to receive debugging commands from the external debugging entity in the form of one or more Ethernet packets for debugging the software application running on the CPU 101. In an embodiment, there may be essentially two streams of data that pass through the Ethernet interface 120, namely (i) a bi-directional and full-duplex data flow related to the JTAG commands and (ii) a unidirectional data flow (from the CPU core 101 to and through the Ethernet interface 120) related to the ETM data flow.

In the embodiment shown in FIG. 1 the on-chip JTAG/ETM-over-Ethernet debug and trace module 110 comprises for its JTAG portion the following components: a JTAG decoder 111a, a JTAG protocol engine 113a and a JTAG packet forwarder 115a. The JTAG decoder 111a is configured to decode the debugging data from the CPU 101. Moreover, the JTAG decoder 111a may be configured to control JTAG clock signals and JTAG data signals 103a for executing debugging commands addressed to the CPU 101, for instance, debugging commands issued by the external debugging entity (being forwarded by the JTAG protocol engine 113a). The JTAG packet forwarder 115a is linked to the Ethernet controller 118.

In an embodiment, the JTAG protocol engine 113a of the on-chip JTAG/ETM-over-Ethernet debug and trace module 110 is configured to translate debugging commands from the external debugging entity into a sequence of JTAG commands and to provide the sequence of JTAG commands to the JTAG decoder 111a. In an embodiment, the JTAG packet forwarder 115a of the on-chip JTAG/ETM-over-Ethernet debug and trace module 110 is configured to receive one or more Ethernet packets including debugging commands from the external debugging entity via the Ethernet interface 120 and forward the debugging commands to the JTAG protocol engine 113a. In an embodiment, the Ethernet packets could be raw MAC packets, but also UDP, TCP or IP packets. The JTAG packet forwarder 115a is configured to parse these kinds of packets and to forward the information content thereof to the JTAG protocol engine 113a.

In the embodiment shown in FIG. 1 the on-chip JTAG/ETM-over-Ethernet debug and trace module 110 comprises for its ETM portion the following components: an ETM decoder 111b, an ETM protocol engine 113b and an ETM packet forwarder 115b. The ETM decoder 111b is configured to decode trace data from the CPU 101, i.e. for receiving and decoding the ETM signals 105a from the CPU 101. In an embodiment, the ETM decoder 111b is further configured to control one or more ETM clock signals and extract the trace data from one or more ETM data signals 105a received from the CPU 101.

As illustrated in FIG. 1, the on-chip JTAG/ETM-over-Ethernet debug and trace module 110 may further comprise a Random Access Memory (RAM) buffer 119 configured to store, for instance, the trace data of the CPU 101 provided by the ETM decoder 111b. In an embodiment, the RAM buffer 119 may implement a FIFO queue for storing the trace data.

In an embodiment, the ETM protocol engine 113b of the on-chip JTAG/ETM-over-Ethernet debugging and trace module 110 is configured to distribute the trace data stored in the RAM buffer 119 (which usually has a substantial size) to a plurality of Ethernet packets. In other words, the ETM protocol engine 113b is configured to control the flushing of the RAM buffer 119. In an embodiment, the ETM protocol engine 113*b* may be further configured to determine a sequence of the plurality of Ethernet packets. In an embodiment, the ETM packet forwarder 115*b* of the on-chip JTAG/ETM-over-Ethernet debugging and trace module 110 may be configured to send the plurality of Ethernet packets created on the basis of the trace data in the RAM buffer 119 via the Ethernet interface 120 to the external debugging entity in accordance with the sequence of the plurality of Ethernet packets determined by the ETM protocol engine 113*b*, thereby allowing the external debugging entity to efficiently reconstruct the trace data.

In order to be able to send large amounts of data, the transmission of the data from the ETM decoder 111*b* to the Ethernet interface 120 may be done without duplication or copies of the data. In an embodiment, the ETM packet forwarder 115*b* is configured to prioritize large data packets. In an embodiment, the size of the RAM buffer 119 may be chosen such that the RAM buffer 119 can store, i.e. buffer a sufficient number of data packets for allowing the ETM decoder 111*b* to stream all data coming from the trace buffer of the CPU 101, while at the same time allowing the ETM protocol engine 113*b* to prepare the packet to be sent. In order to ensure than no packets are lost, the storage capacity of the RAM buffer 119 may depend on the speed of the Ethernet medium for sending out the packets from the Ethernet interface 120. In a further embodiment, the transmission of the data to Ethernet could be handled by using a feature of the ETM block that allows writing the trace data into an external DRAM memory.

As illustrated in FIG. 1, the on-chip JTAG/ETM-over-Ethernet debug and trace module 110 may further comprise a MAC/IP configuration module 117 configured to allow setting or adjustment of MAC/IP configuration parameters of the on-chip JTAG/ETM-over-Ethernet debugging and trace module 110. In an embodiment, a MAC/IP layer configuration may be specified for setting up the MAC/IP configuration and (in case UDP or TCP/IP is used), the IP number and port where the packets should be sent/received.

Figure 2:
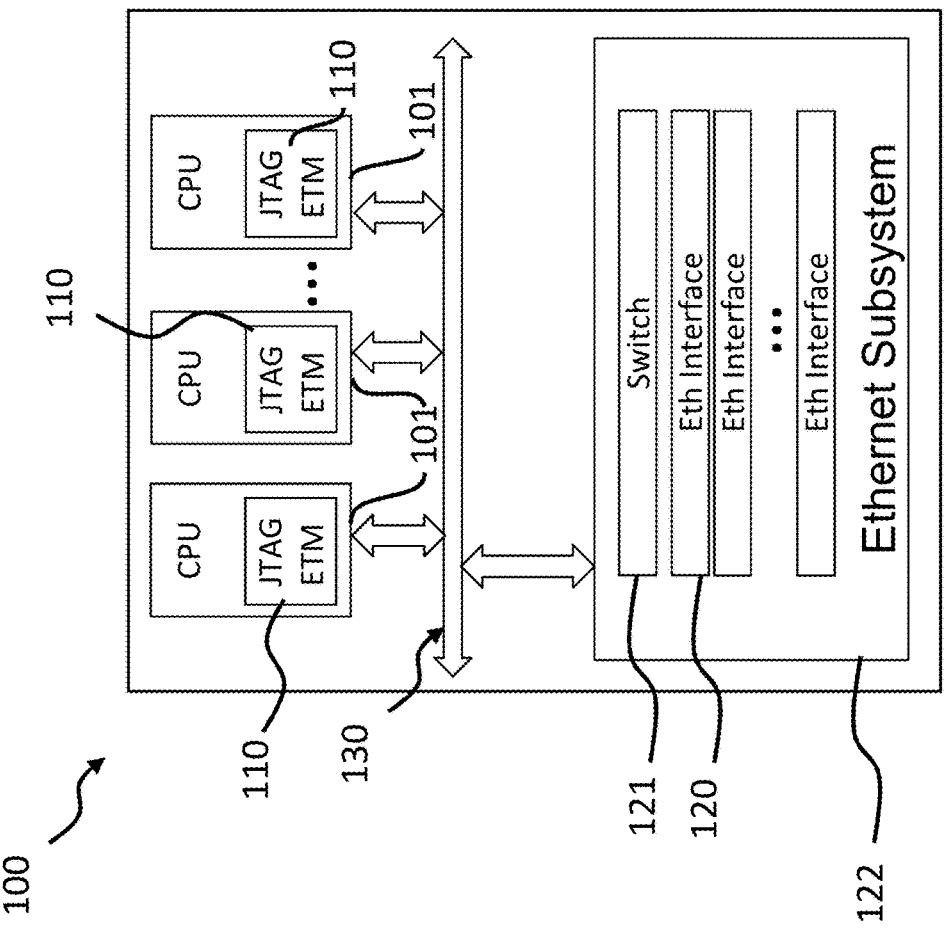
FIG. 2 shows a schematic diagram of a microchip with a plurality of CPUs that can be debugged and traced simultaneously by the on-chip debug and trace over Ethernet engine according to an embodiment.

Moreover, the microchip 100 may further comprise a physical JTAG interface 103, in particular a plurality of external JTAG pins 103 for connecting the CPU core 101 in a conventional way to a JTAG debugging entity and/or a physical ETM interface 105, in particular a plurality of external ETM pins 105 for connecting the CPU core 101 in a conventional way to an external ETM debugging entity A further embodiment of the microchip 100 is shown in FIG. 2. In the embodiment shown in FIG. 2, the microchip 100 is a multi-core microchip 100 and comprises a plurality of on-chip JTAG/ETM-over-Ethernet debug and trace modules 110. In an embodiment, the plurality of on-chip JTAG/ETM-over-Ethernet debug and trace modules 110 of the multi-core microchip 100 of FIG. 2 may have the same or similar components as the on-chip JTAG/ETM-over-Ethernet debug and trace module 110 of the microchip 110 of FIG. 1. As illustrated in the embodiment shown in FIG. 2, the plurality of on-chip JTAG/ETM-over-Ethernet debug and trace modules 110 may be configured to communicate via a communication bus 130 with one or more Ethernet interfaces 120 like the Ethernet interface 120 of the microchip 100 shown in FIG. 1. In the embodiment shown in FIG. 2, the multi-core microchip 100 comprises a plurality of Ethernet interfaces 120 as well as a switch 121 for controlling the plurality of Ethernet interfaces 120. As illustrated in FIG. 2, the plurality of Ethernet interfaces 120 and the switch 121 define an Ethernet subsystem 122 of the multi-core microchip 100.

In an embodiment, the microchip 100 comprises at least one further CPU 101 configured to execute a further debuggable software application and at least one further JTAG/ETM-over-Ethernet on-chip debug and trace module 110. As mentioned above, in an embodiment, the at least two JTAG/ETM-over-Ethernet on-chip debug and trace modules 110 may be configured to communicate via the communication bus 130. The further JTAG/ETM-over-Ethernet debug and trace module 110 is configured to transform further debugging data from the further CPU 101 executing the further software application and further trace data from the further CPU 101 into a further stream of Ethernet packets and to provide the further stream of Ethernet packets to the Ethernet subsystem 122 and to at least one of the pluralities of Ethernet interfaces 120 for transmitting the further stream of Ethernet packets to the external debugging entity. The Ethernet interface 120 is configured to transmit the stream of Ethernet packets provided by the JTAG/ETM-over-Ethernet debug and trace module 110 and/or the further stream of Ethernet packets provided by the further JTAG/ETM-over-Ethernet debug and trace module 110 to the external debugging entity. In an implementation form, the further on-chip JTAG/ETM-over-Ethernet debug and trace module 110 is further configured to receive debugging commands from the external debugging entity in the form of one or more Ethernet packets for debugging the further software application running on the further CPU.

In a further embodiment, the microchip 100 may comprise a plurality of CPUs 101 connected to only a single on-chip JTAG/ETM-over-Ethernet debug and trace module, such as the JTAG/ETM-over-Ethernet debugging and trace module 110 shown in FIG. 1. In an embodiment, the microchip 100 comprises at least one further CPU configured to execute a further debuggable software application. The CPU 101 and the further CPU 101 may be configured to communicate with the single on-chip JTAG/ETM-over-Ethernet debug and trace module 110 via a communication bus, such as the communication bus 130 shown in FIG. 2. In this embodiment, the single JTAG/ETM-over-Ethernet debugging and trace module 110 is configured to transform further debugging data from the further CPU 101 executing a further software application and further trace data from the further CPU 101 into a further stream of Ethernet packets and to provide the further stream of Ethernet packets to the Ethernet subsystem 122 and to the plurality of Ethernet interfaces 120 for transmitting the further stream of Ethernet packets to the external debugging entity. As already described above, the Ethernet subsystem 122 may comprise one or more Ethernet interfaces 120, and an internal Ethernet switch 121, used to route the packets to the appropriate Ethernet interfaces 120. In an embodiment, the on-chip JTAG/ETM-over-Ethernet debug and trace module 110 is further configured to receive debugging commands from the external debugging entity in the form of one or more Ethernet packets for debugging the further software application running on the further CPU 101.

Figure 3B:
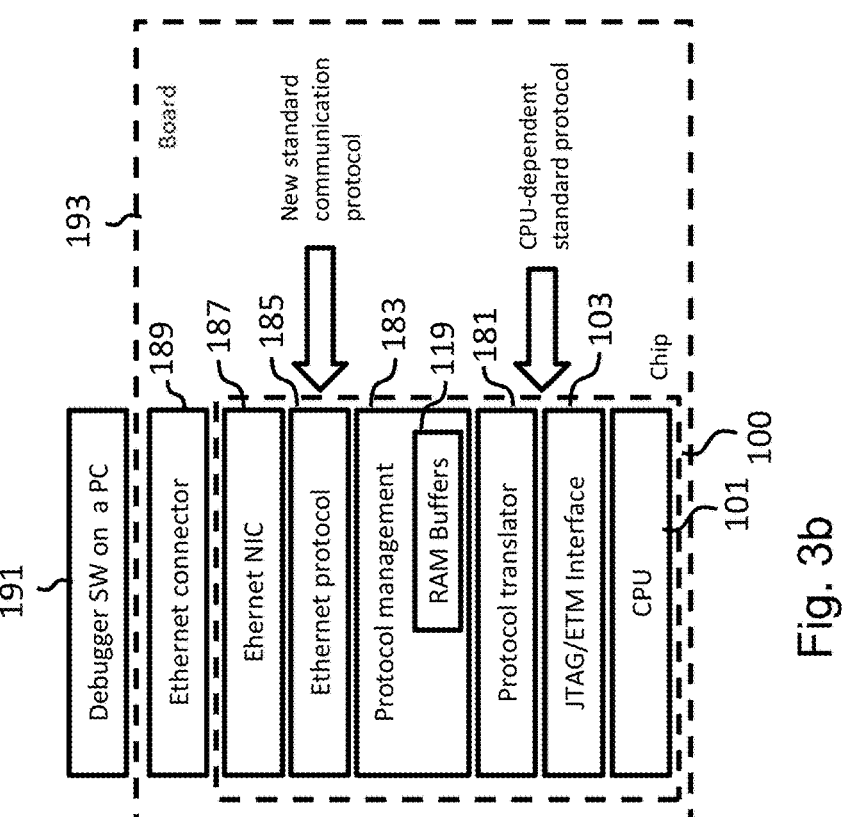
FIG. 3*b* shows a schematic diagram of a software/hardware stack of a debugging system according to an embodiment with a microchip with an on-chip debug and trace over Ethernet engine according to an embodiment.
Figure 3A:
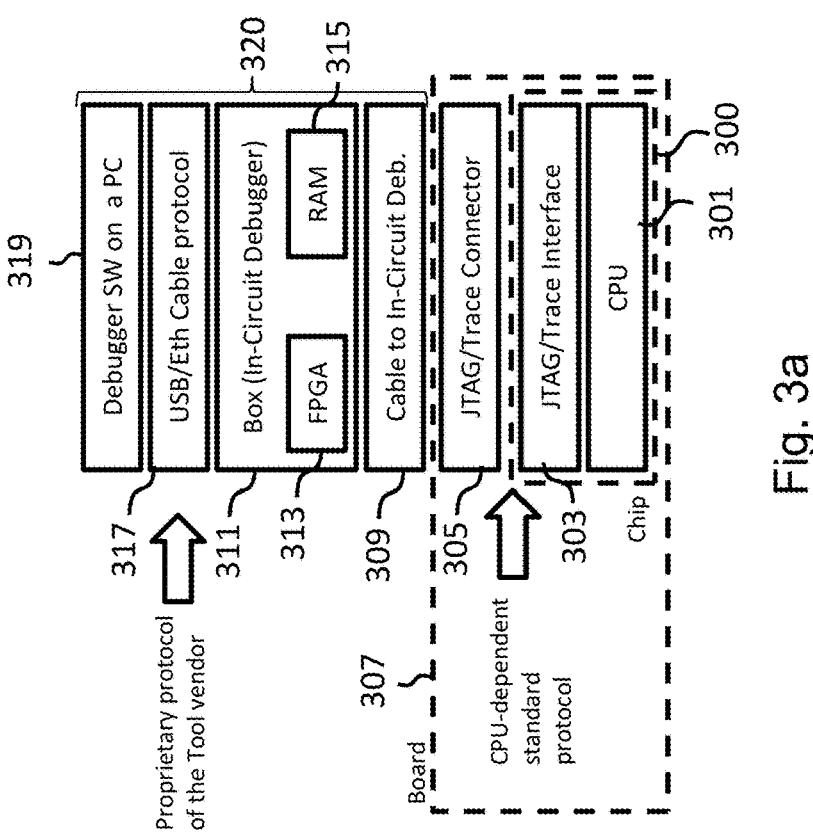
FIG. 3*a* shows a schematic diagram of a software/hardware stack of a conventional debugging system.

FIG. 3*a* shows a schematic diagram of a software/hardware stack of a conventional debugging system, while FIG. 3*b* shows a schematic diagram of a software/hardware stack of a debugging system according to an embodiment comprising the microchip 100 according to an embodiment. The conventional stack shown in FIG. 3*a* comprises a chip 300 with a CPU 301 and a conventional JTAG/ETM interface 303. After that, the JTAG/ETM interface 303 is connected externally by a plurality of pins 305. A (typically short) cable 309 is attached to the connector 305, in order to communicate to an external box 311. The box 311 may typically contain reconfigurable hardware, such as FPGAs 313 and additional RAM memories 315, to store the debug and trace information collected. In some cases an in-circuit debugger 311 and the cable 309 can be integrated on the same PCB board 307 where the microchip 300 is soldered. The box 311 is afterwards connected by means of a connection cable 317 (typically Ethernet or USB) to a Personal Computer 319 running a debugging software. FIG. 3a shows the typical separation from what is provided by the producer of the board 307 including the chip 300, and what is typically provided by "external" debugging tools 320.

The software/hardware stack of a debugging system according to an embodiment comprises the microchip 100 according to an embodiment. As already described above, the microchip 100 comprises the CPU 101 and optionally a conventional JTAG interface 103, i.e. a plurality of JTAG pins 103 and/or a conventional ETM interface 105, i.e. a plurality of ETM pins 105. Moreover, FIG. 3b illustrates a possible stack which includes a protocol translator layer 181 (provided by the decoders 111a and 111b), a protocol management layer 183 (provided by the protocol engines 113a and 113b) with the optional RAM buffer 119, a standard communication protocol layer 185 (provided by the JTAG packet forwarder 115a, the packet forwarder 115b and the MAC/IP configuration unit 117), an Ethernet NIC layer 187 (provided in FIG. 1 by the Ethernet interface 120). All the above is included in the microchip 100, which by means of an Ethernet connector 189 integrated in a board 193 connects the board 193 to the debugger software on the PC 191. As will be appreciated, the debugger software on the PC 191 of the stack shown in FIG. 3b corresponds to the debugger software on the PC 319 of the stack shown in FIG. 3a.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

What is claimed is:

1. A microchip, comprising:
a central processing unit (CPU) configured to execute a software application;
an Ethernet interface configured to transmit Ethernet packets to and receive Ethernet packets from an external debugging entity;
an on-chip debug and trace module configured to transform debugging data and trace data from the CPU into a stream of Ethernet packets and to provide the stream of Ethernet packets to the Ethernet interface;
a further CPU configured to execute a further software application and a further on-chip debug and trace module, wherein the further on-chip debug and trace module is configured to transform further debugging data and further trace data from the further CPU into a further stream of Ethernet packets, and to provide the further stream of Ethernet packets to the Ethernet interface; and
a communication bus configured to communicatively connect the CPU and the further CPU with the on-chip debug and trace module, wherein the Ethernet interface is configured to transmit the stream of Ethernet packets and the further stream of Ethernet packets to the external debugging entity.

2. The microchip of claim 1, wherein the on-chip debug and trace module comprises a joint test action group (JTAG) decoder configured to decode the debugging data from the CPU.

3. The microchip of claim 2, wherein the JTAG decoder is further configured to control one or more JTAG clock signals and one or more JTAG data signals for executing debugging commands addressed to the CPU.

4. The microchip of claim 2, wherein the on-chip debug and trace module comprises a JTAG protocol engine configured to translate one or more debugging commands from the external debugging entity into a sequence of JTAG commands, and to provide the sequence of JTAG commands to the JTAG decoder.

5. The microchip of claim 4, wherein the on-chip debug and trace module comprises a JTAG packet forwarder configured to receive one or more Ethernet packets including debugging commands from the external debugging entity and forward the debugging commands to the JTAG protocol engine.

6. The microchip of claim 1, wherein the on-chip debugging and trace module comprises an embedded trace macrocell (ETM) decoder configured to decode the trace data from the CPU.

7. The microchip of claim 6, wherein the ETM decoder is further configured to control one or more ETM clock signals and extract the trace data from one or more ETM data signals received from the CPU.

8. The microchip of claim 6, wherein the on-chip debug and trace module further comprises a random access memory (RAM) buffer configured to store the trace data.

9. The microchip of claim 8, wherein the on-chip debug and trace module further comprises an ETM protocol engine configured to distribute the trace data stored in the RAM buffer to a plurality of Ethernet packets.

10. The microchip of claim 9, wherein the ETM protocol engine is further configured to determine a sequence of the plurality of Ethernet packets.

11. The microchip of claim 10, wherein the on-chip debug and trace module further comprises an ETM packet forwarder configured to transmit the plurality of Ethernet packets from the RAM buffer via the Ethernet interface to the external debugging entity in accordance with the sequence of the plurality of Ethernet packets determined by the ETM protocol engine.

12. The microchip of claim 1, further comprising a JTAG interface.

13. The microchip of claim 1, wherein the on-chip debug and trace module further comprises a Media Access Control/Internet Protocol (MAC/IP) configuration module configured to enable setting or adjustment of MAC/IP configuration parameters of the on-chip debug and trace module via the Ethernet interface.

14. A debugging system, comprising:

a microchip comprising:

a central processing unit (CPU) configured to execute a software application;

an Ethernet interface configured to transmit Ethernet packets to and receive Ethernet packets from an external debugging entity; and an on-chip debug and trace module configured to transform debugging data and trace data from the CPU into a stream of Ethernet packets and to provide the stream of Ethernet packets to the Ethernet interface; and the external debugging entity, wherein the external debugging entity is configured to send and receive the Ethernet packets via an Ethernet connection from the Ethernet interface of the microchip;

a further CPU configured to execute a further software application and a further on-chip debug and trace module, wherein the further on-chip debug and trace module is configured to transform further debugging data and further trace data from the further CPU into a further stream of Ethernet packets, and to provide the further stream of Ethernet packets to the Ethernet interface; and a communication bus configured to communicatively connect the CPU and the further CPU with the on-chip debug and trace module, wherein the Ethernet interface is configured to transmit the stream of Ethernet packets and the further stream of Ethernet packets to the external debugging entity.

15. A microchip, comprising:

a central processing unit (CPU) configured to execute a software application;

an Ethernet interface configured to transmit Ethernet packets to and receive Ethernet packets from an external debugging entity;

an on-chip debug and trace module configured to transform debugging data and trace data from the CPU into a stream of Ethernet packets and to provide the stream of Ethernet packets to the Ethernet interface; and a further CPU configured to execute a further software application, a further on-chip debug and trace module, and a communication bus configured to communicatively connect the CPU and the further CPU with the on-chip debug and trace module, wherein the further on-chip debug and trace module is configured to transform further debugging data and further trace data from the further CPU executing the further software application into a further stream of Ethernet packets and to provide the further stream of Ethernet packets to the Ethernet interface, and wherein the Ethernet interface is configured to transmit the stream of Ethernet packets and the further stream of Ethernet packets to the external debugging entity.

* * * * *